US007758997B2

(12) United States Patent
Matsumoto et al.

(10) Patent No.: US 7,758,997 B2
(45) Date of Patent: Jul. 20, 2010

(54) SECONDARY BATTERY

(75) Inventors: Isao Matsumoto, Osaka (JP); Shoichi Hashimoto, Osaka (JP); Masayuki Domen, Osaka (JP)

(73) Assignee: M&G Eco-Battery Institute Co., Ltd., Osaka (JP)

( * ) Notice: Subject to any disclaimer, the term of this patent is extended or adjusted under 35 U.S.C. 154(b) by 1267 days.

(21) Appl. No.: 11/141,676

(22) Filed: May 31, 2005

(65) Prior Publication Data

US 2005/0271933 A1 Dec. 8, 2005

(30) Foreign Application Priority Data

May 28, 2004 (JP) ............................. 2004-158947

(51) Int. Cl.
 *H01M 2/18* (2006.01)
(52) U.S. Cl. ...................................... 429/133; 429/131
(58) Field of Classification Search ........................ None
 See application file for complete search history.

(56) References Cited

U.S. PATENT DOCUMENTS

| 3,761,314 | A | | 9/1973 | Cailley |
| 5,047,300 | A | | 9/1991 | Juergens |
| 5,162,178 | A | * | 11/1992 | Ohsawa et al. .............. 429/213 |
| 5,849,431 | A | | 12/1998 | Kita et al. |
| 6,475,667 | B1 | | 11/2002 | Onishi et al. |
| 6,761,993 | B1 | | 7/2004 | Karasawa et al. |
| 6,818,025 | B1 | | 11/2004 | Ura |
| 2004/0096738 | A1 | | 5/2004 | Fukuda et al. |

FOREIGN PATENT DOCUMENTS

| EP | 1087451 | A2 | 3/2001 |
| EP | 1096582 | A1 | 5/2001 |
| EP | 1102337 | A1 | 5/2001 |
| EP | 0771040 | A2 | 1/2008 |
| JP | 9092335 | A | 1/2008 |
| KR | 20040024780 | A | 3/2004 |

OTHER PUBLICATIONS

Matsumoto, I. et al., "Foamed Nickel Positive Electrode For a High Performance Cylindrical Ni-Cd Battery", 16th International Power Sources Symposium 1988, Power Sources 12, Research and Development in Non-Mechanical Electrical Power Sources, edited by T. Keily and B.W. Baxter, Chapter 14, pp. 203-220.
Ogawa, Hiromichi et al., "Metal Hydride Electrode For High Energy Density Sealed Nickel-Metal Hydride Battery", $16_{th}$ International Power Sources Symposium 1988, Power Sources 12, edited by T. Keily and B.W. Baxter, Chapter 26, pp. 393-409.

* cited by examiner

*Primary Examiner*—Patrick Ryan
*Assistant Examiner*—Cynthia Lee
(74) *Attorney, Agent, or Firm*—The Webb Law Firm

(57) ABSTRACT

A secondary battery can prevent microscopic short circuit due to shedding of active material from an electrode and secure electric connection between the electrode and an electrode terminal. According to an example of means for preventing shedding of active material from a positive electrode 1 constituting a wound type electrode unit 7, a negative electrode side of a separator 3 is bent toward a center of the electrode unit 7. The negative electrode 2 having a flex substrate is provided with an electrode end portion 4' with almost no active material. At least a part of the electrode end portion 4' is exposed from the bent separator 3, and the exposed electrode end portion 4' is electrically connected to a battery terminal or a battery case 8 directly or via a negative electrode collector plate 6.

27 Claims, 9 Drawing Sheets

[FIG.1]
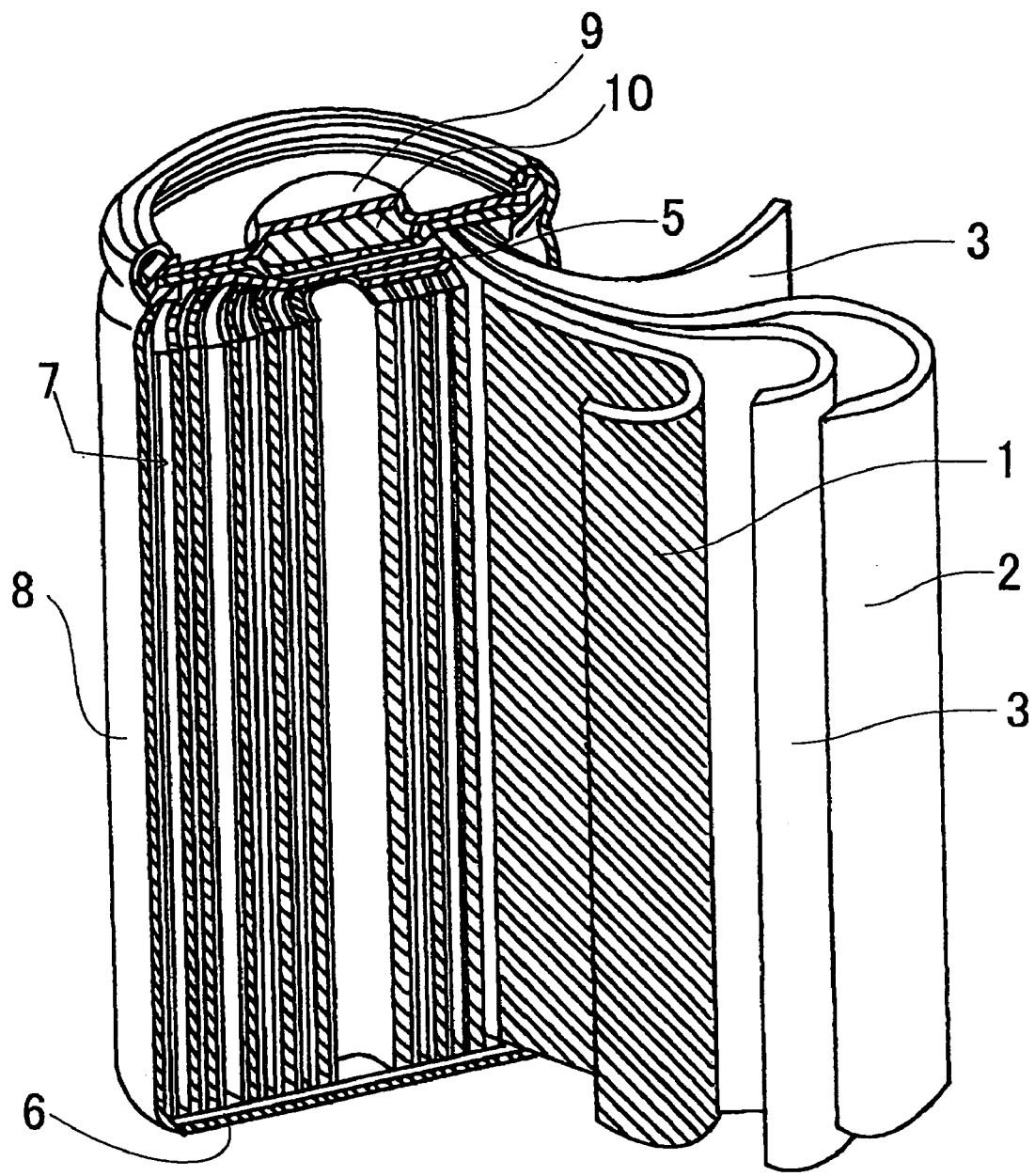

[FIG.2]
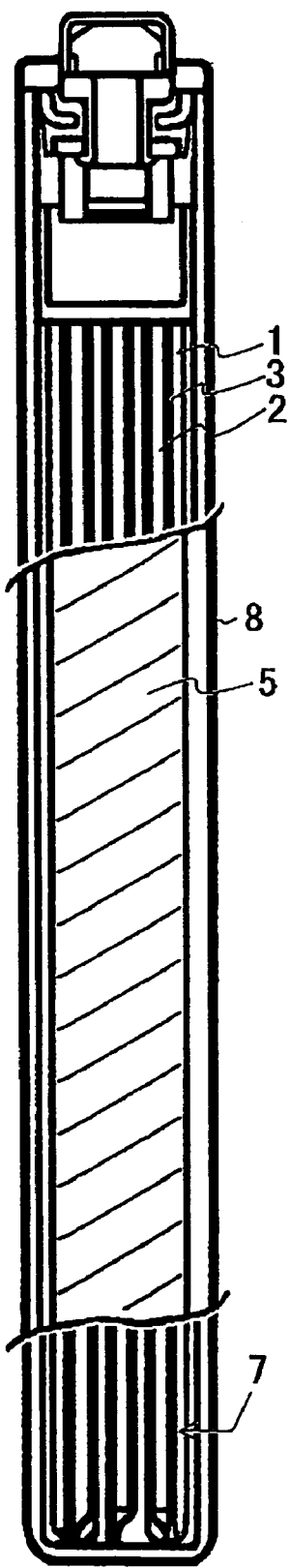

[FIG.3a]
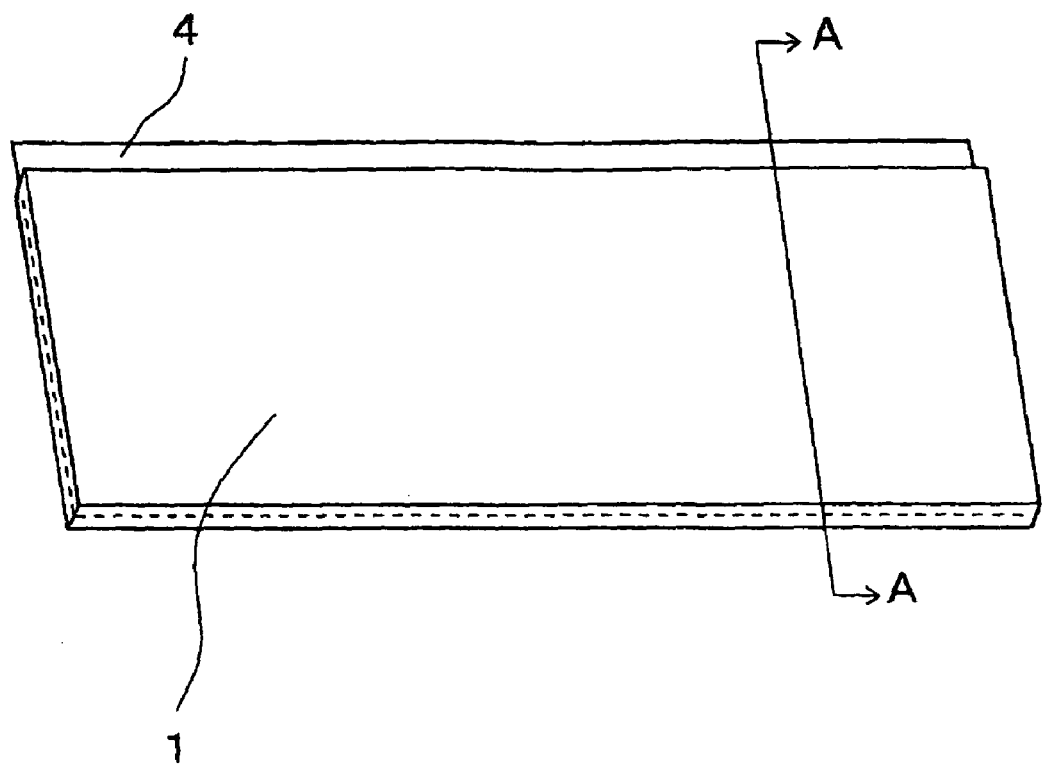
[FIG.3b]
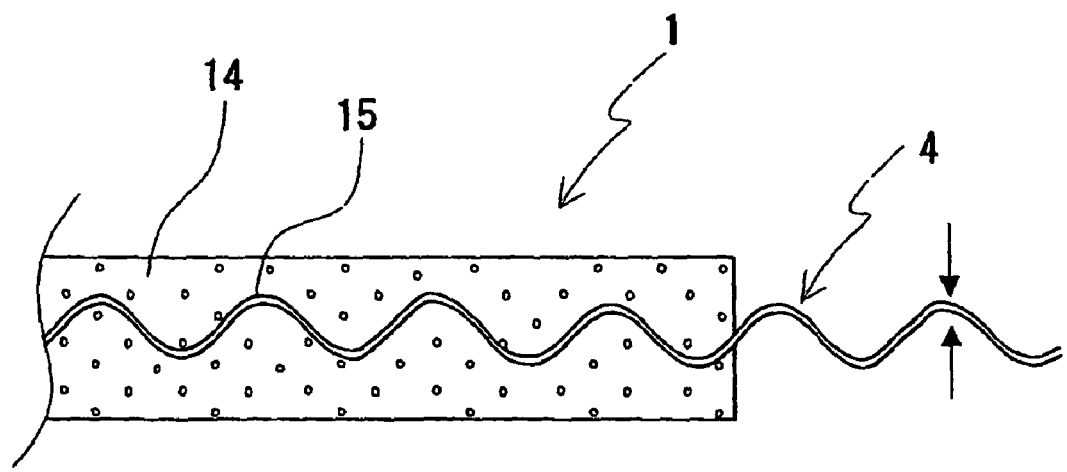

[FIG.4a]
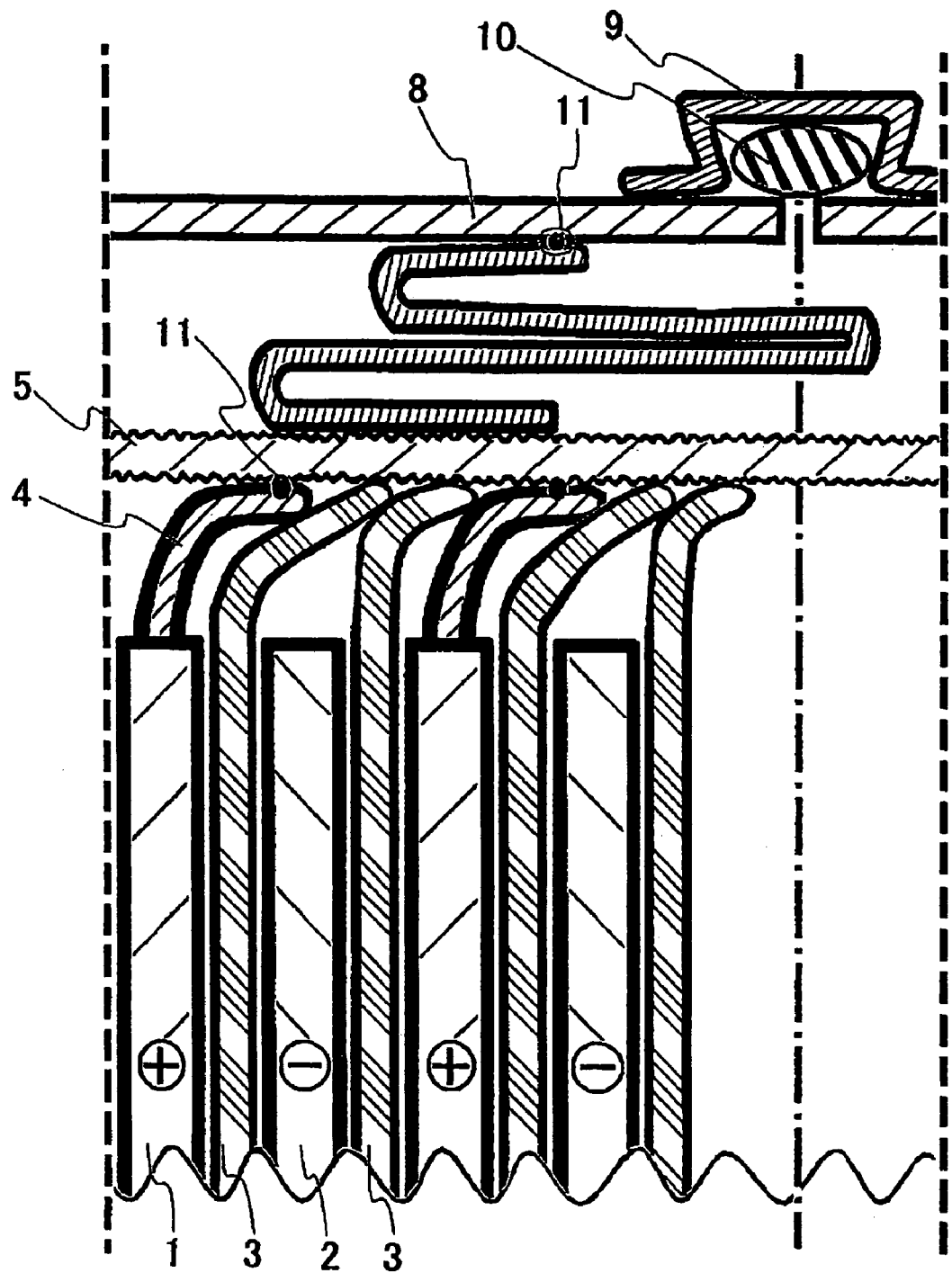

[FIG.4b]
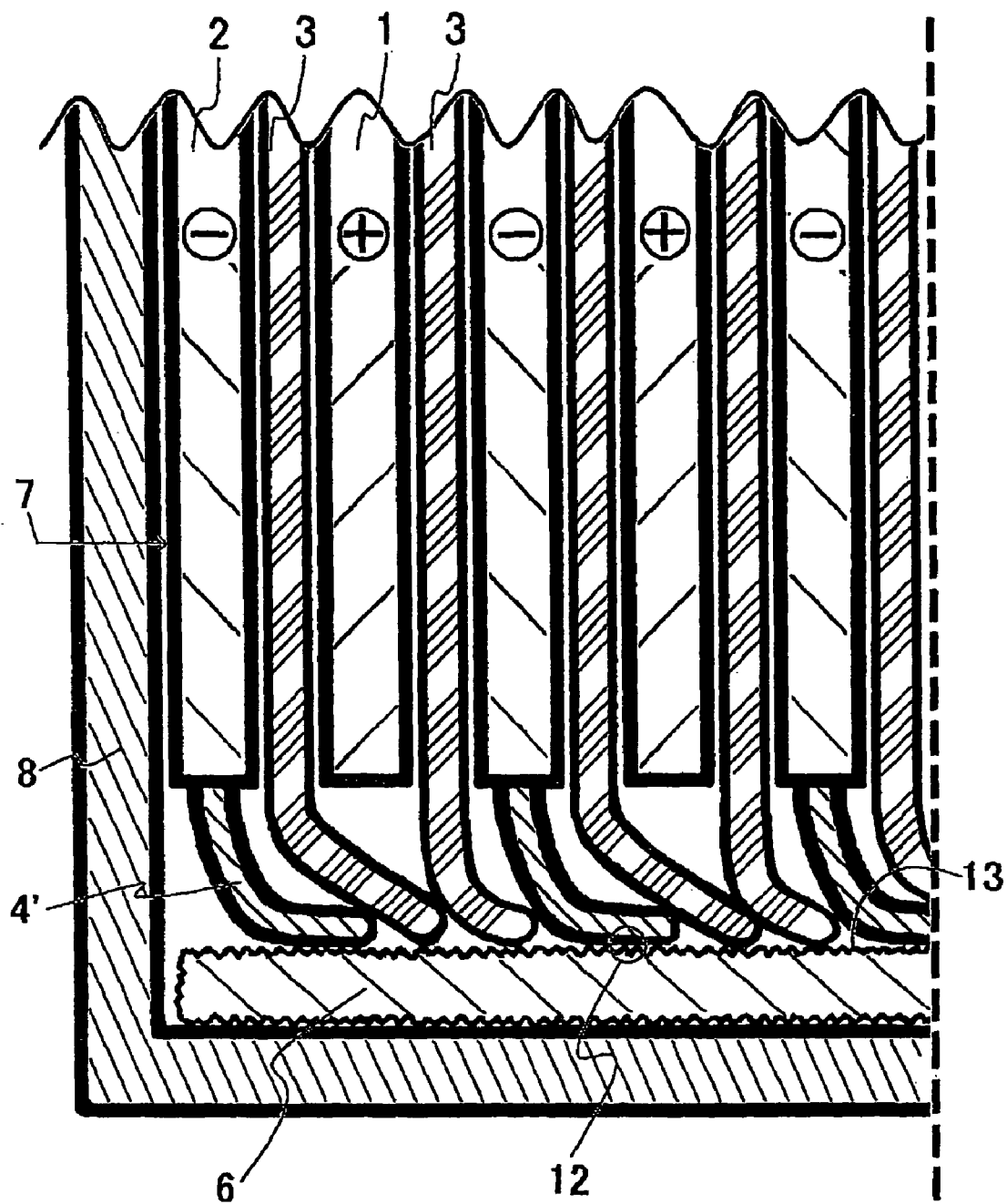

[FIG.4c]
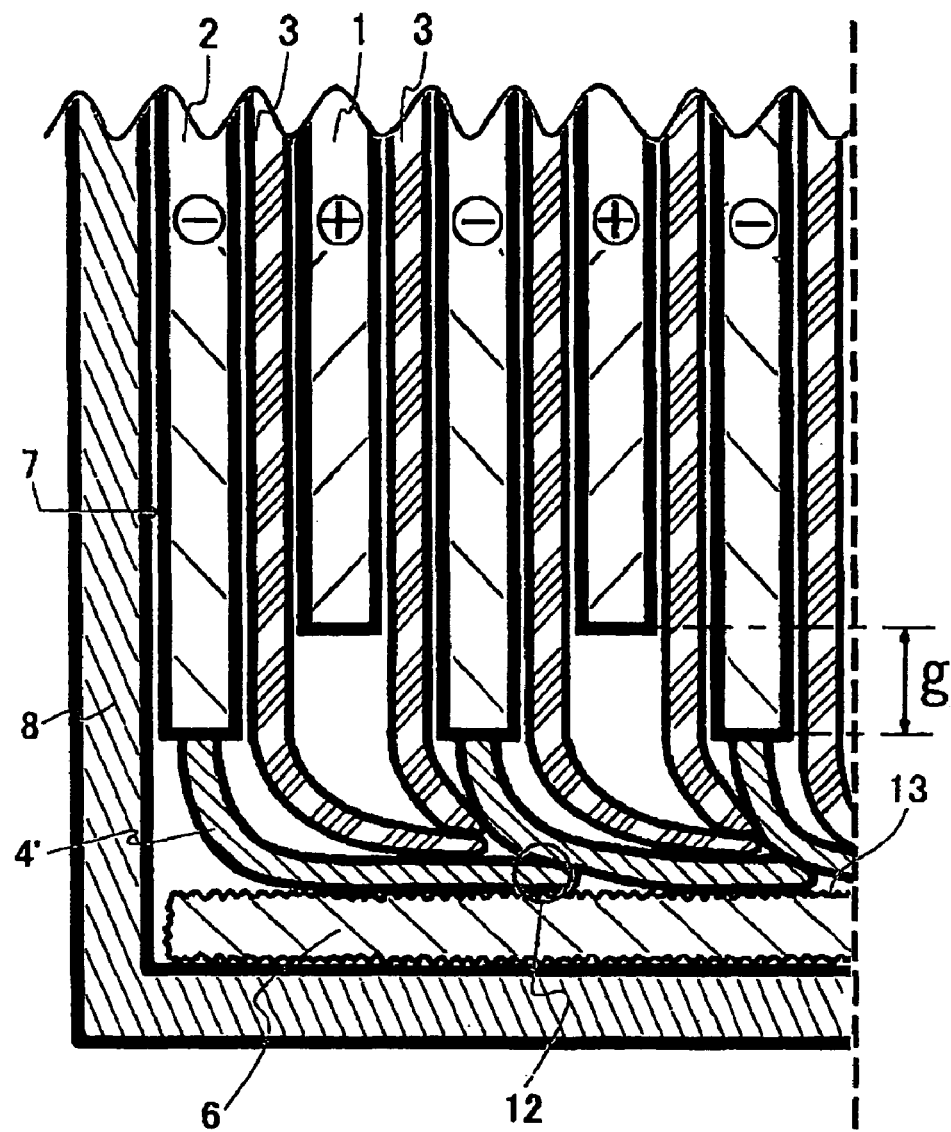

[FIG.5a]
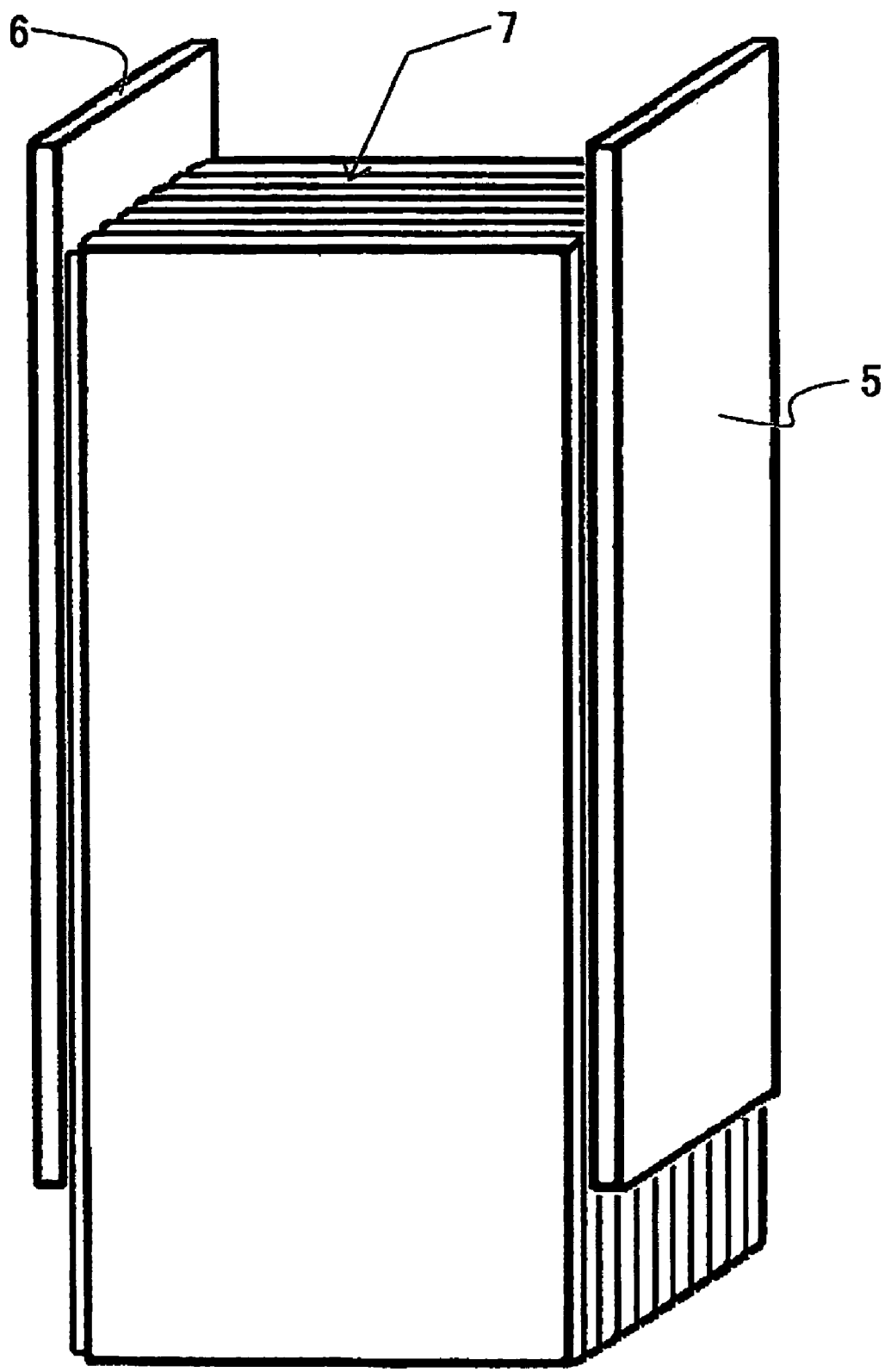

[FIG.5b]
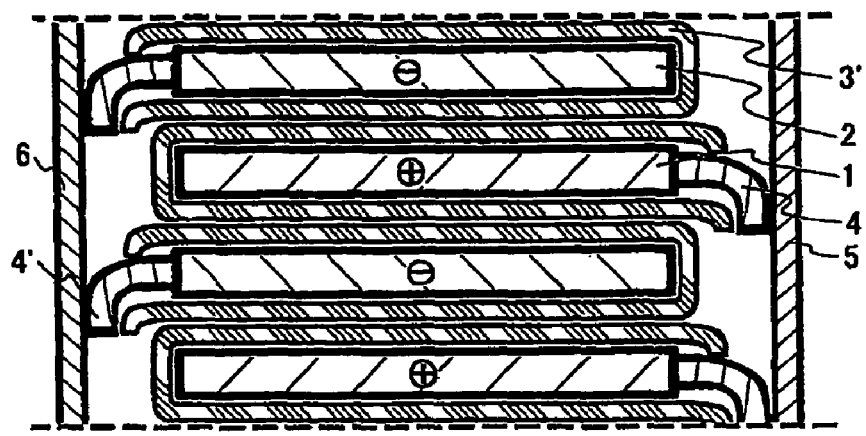
[FIG.6]
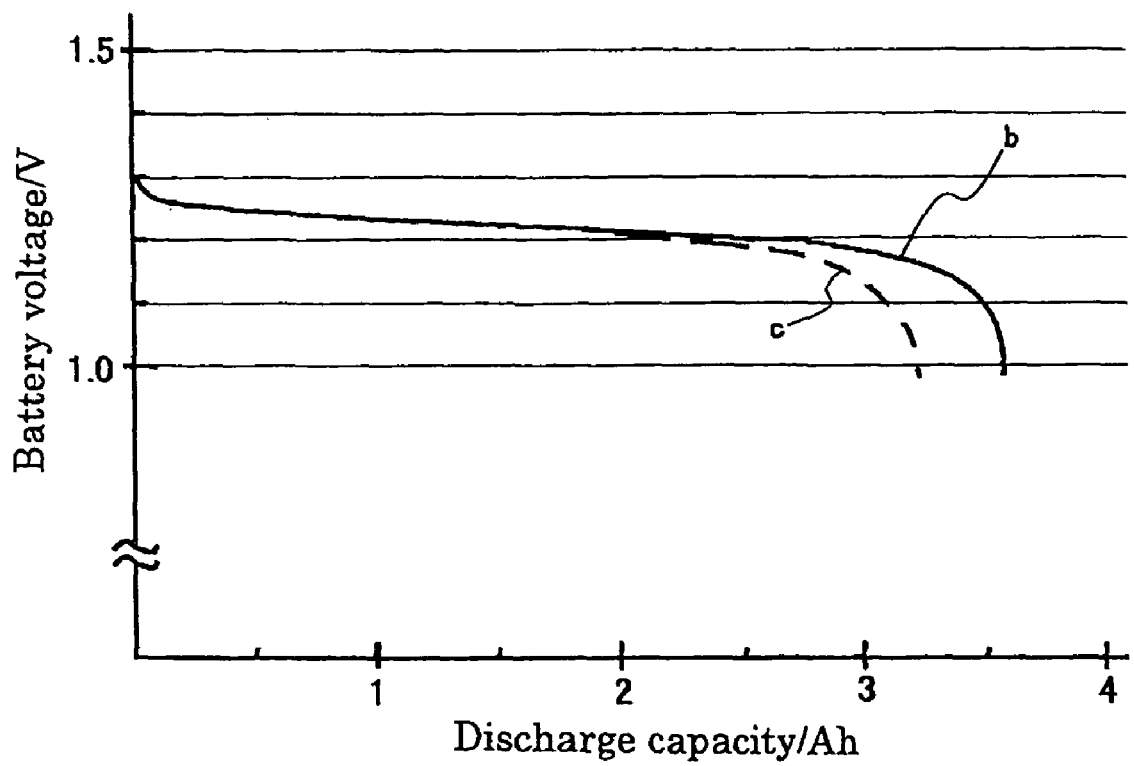

[FIG.7]
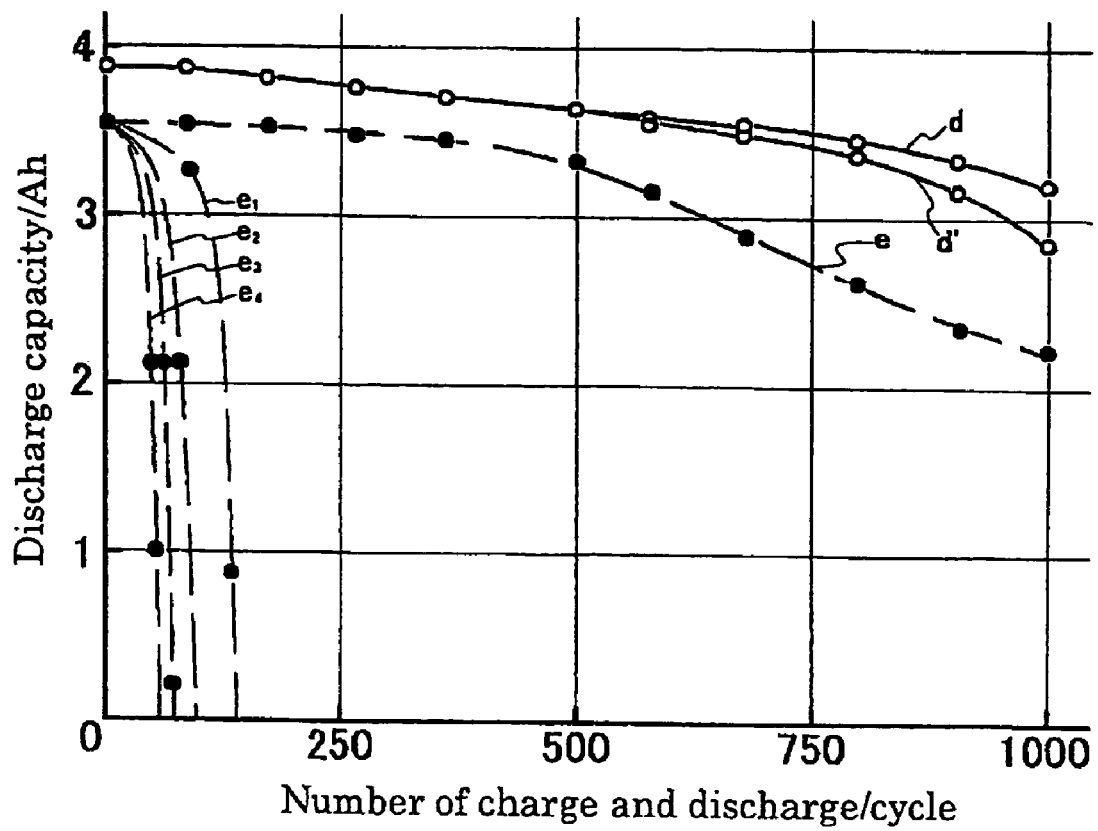

SECONDARY BATTERY

Priority is claimed to Japanese Patent Application No. 2004-158947 filed on May 28, 2004, the disclosure of which is incorporated by reference in its entirety.

BACKGROUND OF THE INVENTION

1. Field of the Invention

The preferred embodiments of the present invention relate, inter alia, to a secondary battery excellent in discharge rate and preferably used as a high power demand battery, especially as an alkaline storage battery.

2. Description of the Related Art

The following description sets forth the inventors' knowledge of related art and problems therein and should not be construed as an admission of knowledge in the prior art. Recently, with respect to compact second batteries, the market tends to strongly demand initially low prices and subsequently, e.g., high energy density and high power. Electrodes of such secondary battery can be generally classified into sintered-type electrodes and paste-type electrodes. In the case of Ni/Cd batteries, Ni/MH batteries and lithium secondary batteries, a paste-type electrode low in cost, light in weight and high in energy density is preferably used as both the positive and negative electrodes. The paste-type electrode is manufactured typically by impregnating paste containing active and/or pseudo-active material powder as a main ingredient in an electrode substrate, or applying and then drying such paste on the electrode substrate. Typical battery structures are shown in FIGS. 1 and 2. The example shown in FIG. 1 employs a spirally wound electrode unit 7 in which a positive electrode 1 and a negative electrode 2 are wound in a spiral manner with a separator 3 interposed therebetween. The example shown in FIG. 2 employs a laminated electrode unit 7 in which a plurality of positive and negative electrodes 1 and 2 are laminated with separators 3 interposed therebetween. In such batteries, inter alia, sealed cylindrical batteries employing a spirally wound electrode unit, in most cases, it is configured such that a single electrode lead is connected to a positive electrode and a negative electrode is exposed from the external periphery of the electrode unit so as to be in direct contact with a metal battery case. Even if a paste-type electrode is employed as both the electrodes, since the lower end of the separator is forcibly bent to cover the entire lower surface of the electrode unit when the electrode unit is inserted into a battery case, an occurrence of short between the positive electrode and the battery case (i.e., the negative electrode terminal) can be prevented. In cases where high power is required, it is necessary to configure such that end portions of both the electrodes are exposed so as to be in contact with collector plates disposed at both ends of the electrode unit. In this case, however, it was difficult to prevent an occurrence of short at the lower end of the electrode unit.

In a sealed cylindrical battery employing a spirally wound electrode unit, which is popular among secondary batteries, in cases where a pasted type electrode is employed as a positive electrode and a negative electrode, powder of active material or pseudo-active material which absorbs/discharges the active material (hereinafter, both materials may be referred to as "active material") of the electrodes will be repeatedly expanded and contracted, thereby causing the powder to shed and accumulate between the end portion of the electrode and the collector plate of opposite electrode. The increase of the shedding materials after charge/discharge cycles causes electric short circuit (i.e., short) thereof.

To avoid this problem, for example, it can be considered to configure such that a top and/or bottom end of the spirally wound electrode unit is sealed so as to prevent the shed active material from coming into contacting with the opposite electrode terminal (collector plate). However, such sealing of both the top and bottom ends of the electrode unit causes a limited contactable area between the electrode and the electrode terminal, resulting in unfavorable configuration for high-energy density and high-power demand secondary battery.

Under the circumstances, a sintered-type positive electrode in which active material is hard to be shed has been used for a power use alkaline storage batteries of the cylindrical. (see, e.g., a non-patent document entitled "Foamed Nickel Positive Electrode for A High Performance Cylindrical Ni—Cd Battery Power Sources 12, 203, (1988)," and a non-patent document entitled "Metal Hydride Electrode for High Energy Density Sealed Nickel-Metal Hydride Battery Power Sources 12, 393 (1988)." However, an employment of such a sintered-type positive electrode causes an increased manufacturing cost and an increased weight.

Furthermore, for example, it also can be considered to configure such that an end portion of the electrode unit is bent so as to prevent the shed active material from coming into contact with the electrodes. However, since a punching metal with an average thickness of 60 µm or more is generally used as an electrode substrate, it is difficult to bend the end portion. Even if the end portion of the electrode can be forcibly bent nearly at right angle, the end portion strongly presses a corner of the adjacent electrode, which may cause micro short via a separator at the pressing portion.

The aforementioned problems reside not only in sealed cylindrical batteries employing a spirally wound electrode unit but also in lamination type batteries as shown, for example, in FIG. 2.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a high power secondary battery with high energy density at low cost.

According to some embodiments of the present invention, a secondary battery comprises an electrode unit in which a positive electrode and a negative electrode are spirally wound with a separator interposed therebetween, wherein the electrode unit has a structure characterized in that (a) the positive electrode and/or the negative electrode includes a flexible electrode substrate and active material or material capable of absorbing/discharging active material (hereinafter referred to "pseudo-active material") impregnated in and/or coated on the electrode substrate, (b) at least one side end portion of the separator wound spirally in a coaxial or elliptical manner is bent toward a center of the electrode unit, (c) the positive electrode has an electrode end portion constituted by the electrode substrate with almost no active and pseudo-active material at a positive terminal side end of the positive electrode, wherein at least a part of the substrate is exposed and bent over the bent separator and the exposed and bent substrate is electrically connected to an electrolyte-proof positive electrode collector plate which is electrically connected to a positive electrode terminal of the battery, and/or the negative electrode has an electrode end portion constituted by the electrode substrate with almost no active and pseudo-active material at a negative terminal side end of the negative electrode, wherein at east a part of the substrate is exposed and bent over the bent separator and an exposed portion of the substrate is electrically connected to an electrolyte-proof negative electrode collector plate which is electrically connected to a negative electrode terminal of the battery.

According to some embodiments of the present invention, a secondary battery comprises an electrode unit in which a plurality of positive electrodes and a plurality of negative electrodes in series, respectively, are superimposed with a separator interposed between adjacent electrodes, wherein the electrode unit has a structure characterized as above.

According to some embodiments of the present invention, a secondary battery comprises an electrode unit in which a positive electrode and a negative electrode are spirally wound with a separator interposed therebetween, wherein the electrode unit has a structure characterized in that:

(a) the positive electrode and/or the negative electrode includes a flexible electrode substrate and powder of active material or pseudo-active material impregnated in and/or coated on the electrode substrate;

(b) at least one side end portion of the separator wound spirally is bent toward a center of the electrode unit;

(c) the positive electrode has an electrode end portion constituted by the electrode substrate with almost no active and pseudo-active material at a positive terminal side end of the positive electrode, wherein at least a part of the substrate is exposed and bent over the bent separator and the exposed and bent substrate portion of the electrode end portion is electrically connected to the electrolyte-proof positive electrode collector plate which is electrically connected to a positive electrode terminal of the battery; and/or the negative electrode has an electrode end portion constituted by the electrode substrate with almost no active and pseudo-active material at a negative terminal side end of the negative electrode, wherein at least a part of the substrate is exposed and bent over the bent separator and an exposed portion of the substrate is electrically connected to an electrolyte proof negative electrode collector plate which is electrically connected to a negative electrode terminal of the battery.

In other words, according to some embodiments of the present invention, at an end portion of a positive terminal side of a positive electrode including a flexible substrate, an electrode terminal portion consisting of an electrode substrate with no active material and pseudo-active material is provided so as to be exposed over the end portion of a separator. The electrode substrate is bent together with the separator so as to cover an end portion of a negative electrode. The exposed electrode substrate of the positive electrode is directly welded to a positive electrode collector plate of a metal plate. Alternatively, at an end portion of a negative terminal side of a negative electrode including a flexible substrate, an electrode terminal portion consisting of an electrode substrate with no active material and pseudo-active material is provided so as to be exposed over the end portion of a separator. The electrode substrate is bent together with the separator so as to cover an end portion of a positive electrode. The exposed electrode substrate of the negative electrode is directly connected to a negative electrode collector plate, or connected to a battery case via a negative electrode collector plate, or connected to negative electrode collector plate and a battery case.

According to a second battery of an embodiment of the present invention, a separator bent toward a center of the electrode unit can retain the active material shedding from the positive electrode and negative electrode, and the active material of the positive electrode does not come into contact with the negative electrode and/or the negative electrode terminal, thereby preventing electric microscopic short circuit.

Furthermore, since a part of the conductive positive electrode substrate bent together with the separator is exposed from the separator and welded to the positive electrode collector plate of the battery at a top end of the spirally wound electrode unit, the positive electrode can be in contact with the electrode collector plate at many points. On the other hand, since a part of the negative electrode substrate is exposed in the same manner from the separator and electrically connected to the negative electrode collector plate and the battery case at a bottom end of the spirally wound electrode unit, the negative electrode can be in contact with the battery case at many contact points. Therefore, a secondary battery having high discharge rate can be obtained.

Since the conductive electrode substrate constituting the electrode end portion of both the positive electrode and the negative electrode is flexible, it is easy to bend and expose the electrode end portion from the separator. Furthermore, even if the electrode end portion is bent together with the separator, it is not necessary to strongly press the opposed electrode and no micro short will occur at the pressed portion.

In cases where each electrode end portion of the positive electrode and negative electrode is electrically connected to the positive electrode collector plate and the negative electrode collector plate, respectively, by welding, the connection between each electrode and respective collector can be secured, resulting in excellent stability.

In cases where the electrode substrate is made of metal containing nickel, iron, nickel-plated steel, aluminum or copper as a main ingredient, the electrode substrate excellent in chemical stability in electrolyte can be obtained at low cost.

In cases where the electrode end portion of the negative electrode is two-dimensional or worked two-dimensionally, and/or has flexibility, the negative electrode can be easily bent.

In cases where a length of the electrode end portion of each of the positive electrode and negative electrode exposed from the separator is set to be 0.2 to 2.0 mm, it is easy to provide electrical connection between the electrode end portion and its corresponding electrode collector plate in the spirally wound electrode unit even after the electrode end portions are bent.

In addition, it is preferable that the end portion of one electrode in the exposed portion/electrode lead side is shortened by 0.5 mm to 2.0 mm from the end portion of the other electrode from the view point of preventing microscopic short circuit.

Although the above explanation is directed to the effects of an embodiment according to the present invention in the case of a spirally wound electrode unit, the same effects can be obtained in the case of a laminated electrode unit for prismatic batteries. In this case, it is preferable that the exposed lead and the separator are together bent from both sides toward a center. In the case of Ni/MH batteries among secondary batteries, since main material, nickel oxide (Ni(OH)$_2$) powder of the active material of the positive electrode is poor in adhesion property, serious shedding of the active material from the positive electrode occurs at the negative electrode side. Accordingly, the aforementioned effects can be demonstrated excellently. Furthermore, in cases where both the negative electrode and the positive electrode have the aforementioned structure, the shedding of the active material from both the negative electrode and the positive electrode can be prevented effectively, the separator forms a bag by bending together, and therefore, the effects can be most effectively demonstrated.

In addition, in a case of high power demand batteries, a thin electrode is generally used as both the positive electrode and the negative electrode. Therefore, an electrode substrate is necessary to be thin, resulting in inferior physical strength. In such case, the aforementioned effects can also be demonstrated effectively.

BRIEF DESCRIPTION OF THE DRAWINGS

The accompanying figures are provided by way of example, without limiting the broad scope of the present invention or various other embodiments, wherein:

FIG. 1 is a schematic explanatory view showing a vertical cross-section of a sealed cylindrical battery.

FIG. 2 is a schematic explanatory view showing a vertical cross-section of a sealed prismatic battery;

FIG. 3 a is a perspective view showing an electrode according to an embodiment of the present invention;

FIG. 3b is a schematic enlarged cross-sectional view taken along the line A-A in FIG. 3a;

FIG. 4a is an enlarged schematic view showing a vertical cross-section of a positive electrode side according to an embodiment of the present invention;

FIG. 4b is an enlarged schematic view showing a vertical cross-section of a negative electrode side according to an embodiment of the present invention;

FIG. 4c is an enlarged schematic view showing a vertical cross-section of a negative electrode side according to another embodiment of the present invention;

FIG. 5a is a schematic view showing the battery shown in FIG. 2;

FIG. 5b is an enlarged cross-sectional view showing the battery shown in FIG. 5 a as seen from the top;

FIG. 6 is a graph showing initial discharging curves; and

FIG. 7 is a graph showing cycle-life performance curves.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

The following explanation will be directed to some preferred embodiments according to the present invention in which occurrence of a microscopic short circuit between a positive electrode and a negative electrode due to active material shed from the positive electrode is prevented. However, it should be noted that the present invention is not limited to the above, and for example, can also be applied to embodiments in which occurrence of a microscopic short circuit between a positive electrode and a negative electrode due to active material shed from the negative electrode is prevented.

FIG. 1 shows one of preferable embodiments of a sealed cylindrical battery (cell). As shown in FIG. 1, in this sealed cylindrical battery, a cylindrical electrode unit 7 is fitted in a cylindrical battery case 8 with an upper opening of the battery case 8 hermetically sealed with a cap 9.

FIG. 4b is an enlarged schematic cross-sectional view showing a lower part of the negative electrode side of the battery shown when the present invention is applied to a sealed cylindrical battery (cell) in FIG. 1 for the purpose of explaining the structure of the electrodes according to the preferable embodiment of the present invention. In the electrode unit 7 in which electrodes 1 and 2 are spirally wound, a set of "a positive electrode 1, a separator 3, a negative electrode 2 and a separator 3" appears repeatedly from a central portion to a peripheral portion in a cross-sectional view. In FIG. 4b, the right side denotes a center side, and the left side denotes a peripheral portion side. In FIG. 4a, an enlarged schematic cross-sectional view showing a part of the positive electrode side of the electrode unit 7 when the present invention is applied to a sealed cylindrical battery (cell) in FIG. 1 is shown. As shown in FIG. 4b, a part of the negative electrode substrate with no active material and the like constitutes an electrode terminal at the lower end of the negative electrode, and is electrically connected to a negative electrode collector plate 6 with the electrode terminal exposed from the separator 3. In cases of the negative electrodes, since a metallic substrate or the like is hard to get rust, there will be no problem even if the exposed electrode terminal 4' and the negative electrode collector plate 6 are only in contact with each other. However, if they are welded at many points, more stabilized low resistance can be attained. Further, it is preferable to elongate the electrode terminal even if the end portion 4' overlaps the adjacent electrode terminal from the viewpoint of further improved physical strength at the time of welding a metal plate and reduced resistance.

Since it is preferable that the welded points are not concentrated in one portion, the welded points preferably form plural radial patterns extending from the center of the spirally wound electrodes. The negative electrode collector plate 6 is in contact with or welded to a battery case 8, resulting in low resistant electric connection between the negative electrode 2 and the battery case 8 as a whole. According to this structure, even if the negative electrode 2 is formed by one sheet or a plurality of sheets connected in series at certain intervals, electric connection can be attained without problems.

On the other hand, the lower end portion of the positive electrode 1 shown in FIG. 4 b is packed by the separators 3 and 3 bent together with the negative electrode end portion 2, thereby preventing the short between the positive electrode 1 and the negative electrode 2 due to the shed active material powder or pseudo-active material powder of the positive electrode 1. Although in this explanation a structural view using the negative electrode collector plate 6 is shown, since the metalic substrate constituting the end portion 4' of the negative electrode is hard to get rust because of the previously mentioned potential relation, it is possible to employ a structure in which the negative electrode end portion 4' and the battery case 8 directly come into contact with each other without using the electrode collector plate 6. Further, in order to prevent micro microscopic short circuit surely, as shown in FIG. 4c, it is preferable to shorten the length of the lower end portion of the positive electrode by g (about 0.5 to 2.0 mm) compared with the length of the lower end portion of the negative electrode.

Further, in the side of the positive electrode collector plate, it is preferable to shorten the length of the lower end portion of the negative electrode by g (about 0.5 to 2.0 mm) compared with the length of the lower end portion of the positive electrode.

FIG. 3a shows an example of structure of an electrode. Although the reference numerals in the drawing are directed to the positive electrode 1, the negative electrode 2 has the same structure. FIG. 3b is a schematic enlarged cross-sectional view taken along the line A-A' of the electrode 1 shown in FIG. 3a. A mixture 14 containing active material and pseudo-active material as a main ingredient is impregnated in and/or coated on both sides of an electrically conductive electrode substrate 15, and they are finally worked with, e.g., press rolls.

The electrode side end portion 4 of the electrode 1 is constituted by the substrate 15 obtained by removing almost all of the active material, etc., from the electrode 1 along the side of the electrode 1, and therefore it can be easily bent together with the separator 3. It is preferable that the electrode side portion 4 is formed into a two-dimensional configuration by press forming prior to impregnating or coating of the active material or the like to easily remove the active material or the like. It is also preferable that almost no active material or the like exists on the electrode side portion 4 for subsequent easy welding operation or the like.

As the material for the electrode substrate 15 of the positive electrode 1 and the negative electrode 2 of the present invention, it is preferable to use electrically conductive material having electrolyte-resistant characteristics, especially, metal. Concretely, for example, in the case of alkaline storage batteries represented by Ni/Cd and Ni/MH batteries, nickel, iron or nickel-plated steel plate can be exemplified, and in the case of lithium batteries, metal including either aluminum or copper as a main ingredient can be exemplified.

In an explanatory example of the secondary battery according to the present invention, at least one side end of the spirally wound separator 3 is bent toward the center of the electrode unit (toward the right side in the embodiment shown in FIG. 4b). This structure enables the bent portion of the separator 3 to retain the active material shed from the positive electrode 1, thereby causing no short-circuited of the positive electrode 1 and the negative electrode 2. The exposure of the electrode end portion 4' of the negative electrode 2 from the separator 3 after the bending can be attained by setting an edge of the electrode end portion 4' of the negative electrode 2 to be longer than that of the separator 3. The reasons for bending the separator 3 not toward the periphery of the electrode unit but toward the center thereof are to perform an easy bending operation and prevent an increase in diameter of the electrode unit to thereby perform easy inserting operation of the electrode unit 7 into the battery case 8.

In the preferred embodiment of the present invention, with the use of the electrode end portion 4' of the negative electrode 2 exposed from the separator 3, the electrode end portion 4' is electrically connected to the negative electrode collector plate 6 and the battery case 8 of the battery. FIG. 4b exemplifies the case in which the negative electrode end portion 4' of the negative electrode 2 is electrically connected to the battery case 8, i.e., the negative electrode battery terminal, via the negative electrode collector plate 6. The negative electrode collector plate 6 serves as intermediary for connecting the electrode end portion 4' of the negative electrode 2 to the electrode terminal. Therefore, as the material of the negative electrode collector plate 6, it is preferable to use metallic material excellent in electrical conductivity having electrolyte-resistant characteristics. In addition, the electrode end portion 4' of the negative electrode and the negative electrode collector 6 may contact or may be melted for electrical conduction, and in effect, the paste-type electrode of the present invention may overlap adjacent end portion (corresponding to end portion 4' of the negative electrode). It is further preferable that, in order to reduce the risk of microscopic short circuit when the electrode expands three-dimensionally due to repeated charge and discharge, as stated in the example of the positive electrode, the end portion of the positive electrode 1 is shortened by 0.5 mm to 2.0 mm from the end portion of the negative electrode 2 in the terminal side of the negative electrode as well.

Concretely, in the case of alkaline storage batteries, nickel, iron and nickel-plated steel plate can be exemplified, and in the case of lithium batteries, metal containing aluminum as a main ingredient can be exemplified as a positive electrode collector plate, and metal containing copper as a main ingredient can be exemplified as a negative electrode collector plate. It is preferable that the electric connection between the electrode end portion 4' of the negative electrode 2 and the negative electrode collector plate 6 is attained by welding in order to obtain secure connection. It is, however, possible to directly connect the electrode end portion 4' of the negative electrode 2 to the battery case 8 or the battery terminal. Furthermore, the length of the electrode end portion 4' can be longer than that of the embodiment illustrated in FIG. 4b. In this case, the adjoining electrode end portions 4' can also be welded to each other at the time of welding the electrode end portion 4' to the negative electrode collector plate 6, resulting in stronger welding.

It is necessary that the electrode substrate 15 of the positive electrode 1 and that of the negative electrode 2 are flexible so that the end portion 4 and 4" can be easily bent. In this disclosure, the flexible substrate denotes a substrate having a characteristic capable of being easily bent together with a separator 3 with a thickness of about 100 μm at nearly 90 degrees. As one of the methods of obtaining such a flexible substrate, a method of decreasing the thickness of the substrate can be exemplified. Concretely, in the case of annealed nickel, a substrate having an average thickness of 40 μm (corresponding to about 350 g/m$^2$) or less as a metal use amount meets the requirement of the flexible substrate. Furthermore, in the case of a steel sheet with a nickel plating of about 3 μm thickness, a substrate having an average thickness of 20 μm (corresponding to about 250 g/m$^2$) or less as a metal use amount meets the requirement of the flexible substrate. Furthermore, in the case of an aluminum or copper substrate, no annealing is required, and in either case a substrate having an average thickness of 50 μm or less as a metal use amount meets the requirement of the flexible substrate.

It is preferable that the electrode end portion 4' of the negative electrode 2 according to the present invention is formed or worked into a two-dimensional configuration. In this disclosure, the forming or working into "two-dimensional configuration" denotes that an original three-dimensional electrical conductive substrate is approached to a two-dimensional configuration with a pressing operation or the like for the purpose of enhancing the current collecting performance of electrode reaction. This processing makes it possible to easily remove the impregnated or coated active material, thereby improving the electric connection or contact to the electrode collector plate or electrode terminal. Furthermore, the aforementioned working to the electrode end portion 4' of the negative electrode 2 enables an easy bending operation at the electrode end portion. The two-dimensional working can be performed, in advance, by rolling a material such as a metallic plate to be used as an electrode substrate with a roller press. In cases where a two-dimensional electrode substrate is employed as a starting material, the aforementioned rolling operation is not required, and it is sufficient to simply meet the requirement of the flexible substrate.

It is preferable that the length of the electrode end portion 4' of the negative electrode 2 of the present invention exposed from the separator 3 is 0.2 to 2.0 mm. If the length of the exposed portion falls within this range, it is easy to bend and enough to expose the electrode end portion 4" to electrically connect it to the negative electrode collector plate 6 and/or the battery case 8.

It is preferable that the negative electrode collector plate 6 has a number of fine concavities and convexities on the surface thereof and is finely three-dimensional. The concrete examples of the collector having a number of concavities and convexities include a foam-like metal sheet, a corrugated worked sheet, a metal sheet provided with a number of concavities and convexities each having a diameter of 1 mm or so, and a perforated sheet having a number of holes each having a diameter of 1 mm or so with burrs remained. Providing a number of concavities and convexities makes it possible to perform an easy welding of the collector 6 to the electrode end portion 4' of the negative electrode 2 and decrease the resistance therebetween by improving the connecting strength.

As a material of the separator 3, known materials such as resin fibers can be used. In general, a non-woven fabric made of synthetic resin fibers having strength against bending and electrolyte-resistance performance can be used. In the case of alkali storage batteries, among other things, it is preferable to use a thin non-woven fabric made of polyolefin types synthetic resin fibers to which hydrophilic characteristic is given by sulfonation processing. This non-woven fabric made of polyolefin types synthetic resin fibers can be preferably used as a material of the separator 3 of the present invention since it is thin and hard to occur cracking at the time of bending.

(Manufacturing Method)

General-purpose secondary batteries have two types, i.e., a sealed cylindrical type as shown in FIG. 1 and a sealed prismatic type as shown in FIG. 2. Hereinafter, a method of manufacturing an electrode unit for use in the former sealed cylindrical type secondary batteries will be described. In order to obtain an electrode unit 7 of an embodiment of the present invention, a positive electrode 1, a negative electrode 2 and a separator 3 are superimposed with the respective width adjusted. At this time, at the negative electrode side of the negative electrode 2, an exposed electrode end portion 4 with almost no active material or the like disposed in a frill-like manner along the side end portion of the negative electrode is formed. FIGS. 4a, 4b, and 4c are a schematic cross-sectional view showing the positive electrode side of the spirally wound electrode unit and that of the negative electrode side thereof, respectively. It is preferable that the edge of the negative electrode side edge protrudes from the edge of the separator 3 by 0.2 to 2 mm when the positive electrode 1, the separator 3 and the negative electrode 2 are superimposed.

In particular, when the positive and/or negative electrode are/is subject to three-dimensional swelling due to repeated charge and discharge, as shown in g of FIG. 4c, it is preferable that the end portion of one electrode is shortened by 0.5 mm to 2.0 mm in order to avoid microscopic short circuit in the long-term. Moreover, as shown in the lower part of said FIG. 4c, it is preferable that the bent portion of an electrode lead overlaps adjacent electrode lead for the improved strength at the time of welding.

When the electrode unit 7 is manufactured by winding the electrodes 1 and 2 and separator 3 with the positive electrode 1 adequately shifted, the separator 3 and the electrode end portion 4' of the negative electrode 2 protrude from the negative electrode side. FIGS. 4b and 4c are schematic cross-sectional view showing a part of the negative electrode side of the electrode unit at this manufacturing stage. When the separator 3 is bent toward the center of the electrode unit, the separator 3 covers the edge of the positive electrode 1, and a part of the electrode end portion 4' of the negative electrode 2 is exposed from the separator 3. In this configuration, no microscopic short circuit will occur even if the active material is shed from the positive electrode 1, and a connecting portion between the negative electrode 2 and the negative electrode collector plate 6 or the battery case 8 can be secured.

Example 1

A nickel foil having a thickness of about 30 µm was formed into a three-dimensional configuration having an apparent thickness of about 300 µm by forming concavities and convexities with a pitch of about 300 µm to thereby obtain an electrode substrate. To this electrode substrate, aqueous solution paste (water content of about 21 wt %) containing 8 parts by weight of cobalt oxide (CoO), 5 parts by weight of zinc oxide (ZnO) and 2.5 parts by weight of fluorocarbon resin powder with respect to 100 parts by weight of Ni(OH)$_2$ powder with average diameter of 15 µm was impregnated and coated. Then, the substrate was dried at 100° C. and then pressed to obtain a positive electrode with a thickness of 400 µm. Thereafter, the positive electrode was cut into a piece of 37 mm width and 450 mm length. The impregnated and coated powder mixture was removed at a 2 mm width from both surfaces of one longitudinal side end with a blast to expose the electrode substrate 15. Thus, a positive electrode for sub C(Cs) sized Ni/MH batteries as shown in FIGS. 3a and 3(b) was obtained.

To the similar electrode substrate having a thickness of 20 µm, aqueous solution paste (water content of 14 wt %) containing 1 part by weight of carbon powder, 1.5 parts by weight of carboxymethyl cellulose and 1 part by weight of fluorocarbon resin series fine powder with respect to 100 parts by weight of general-purpose MmNis series hydrogen absorbing alloy powder with an average diameter of about 30 µm was impregnated and coated. Then, the substrate was dried at 90° C., and pressed to obtain a negative electrode with a thickness of 230 µm. Thereafter, the negative electrode was cut into a piece of 37 mm width and 540 mm length. The impregnated and coated powder mixture was removed at a 2 mm width from both surfaces of one longitudinal side end with a blast to expose the electrode substrate 15. Thus, a positive electrode for sub C(Cs) sized Ni/MH batteries as shown in FIGS. 3a and 3b was obtained.

The obtained positive electrode and negative electrode were wound together with a separator of polyolefin non-woven fabric having a 50 to 90 µm thickness and 38 mm width to form a spirally wound electrode unit. In winding, the positions of the positive electrode and negative electrode were shifted so that the respective exposed substrate stuck out from the separator by 0.5 mm. The outer periphery of the wound electrode unit was secured with a tape. The schematic cross-section of the positive electrode side and that of the negative electrode side are shown in FIG. 4a and FIG. 4b, respectively. Then, the positive electrode substrate exposed at the upper end side of the electrode unit was bent toward the center of the electrode unit together with the separator, and a disk-shaped nickel collector provided with a number of fine concavities and convexities having a thickness of 200 μm and a diameter smaller than that of the electrode unit was disposed on and welded to a part of the positive electrode substrate exposed from the separator in four radial patterns.

Similarly, the negative electrode substrate exposed at the bottom end side of the electrode unit and the separator were bent and secured in that state. Since the substrate in Example 1 was a flexible substrate, the bending work was performed with no difficulty.

In addition, although the basic idea is the same as above, another constitutional example is shown in FIG. 4c, where the bottom end portion of the positive electrode is shortened by 0.5 mm to 2.0 mm from the bottom end portion of the negative electrode lead side. FIG. 4c further shows the constitution where the bent negative electrode lead overlaps adjacent negative electrode lead.

Subsequently, a substrate obtained by cutting a negative substrate into a disk-shape, i.e., a collector, was disposed on an inner bottom of a general-purpose Cs sized battery case, and thereafter, the aforementioned electrode unit was inserted in the case. After pouring 30% KOH aqueous solution of 3.5 cc therein, a general-purpose cap was welded to the positive electrode collector plate to thereby obtain a Cs sized Ni/MH battery with capacity of 3700 mAh.

In this explanation, an embodiment in which the electrical connection between the collector at the negative electrode side and the exposed substrate of the negative electrode is performed by a mere contact is exemplified. However, it can be configured such that an electrode bar is inserted through a central space of the electrode unit to the bottom and the collector and the battery case is welded. Furthermore, it also can be configured such that a plurality of positive electrodes and/or negative electrodes are wound spirally and connected in series to form a unit and each electrode is connected to the corresponding terminal in the same manner as mentioned above. In this embodiment, three-dimensioned nickel foil is exemplified as both the positive and negative electrode substrate. Alternatively, a foamed porous nickel member or the like, which is easily bent together with a separator, can also be used.

Comparative Example

In a conventional structure of an electrode unit using positive and negative electrode collector plates like the present invention, an exposed substrate of each of the positive and negative electrodes is strengthened by seamlessly welding a nickel foil of 2 mm width or so (the thickness being 100 to 200 μm) thereto. The exposed substrate is not bent together with the separator, but welded to a collector disposed to each of the upper and lower ends of the electrode unit. In conventional Ni/MH batteries, foamed nickel is used for a positive electrode substrate, punching nickel-plated steel is used for a negative electrode substrate, and non-woven polypropylene fabric with a thickness of 120 μm or so thicker than that of Example 1 is used for a separator. In contrast with the flexible electrodes of the aforementioned Example, general-purpose positive and negative electrodes crack at the time of winding processing to cause acute-angled portions, causing a microscopic short circuit. Therefore, it is necessary to increase the thickness of the separator.

Positive and negative electrode substrates employing a mixture of fine powder containing active or pseudo-active material as a main ingredient were prepared in the same manner as in Example 1. A nickel foil with a thickness of 200 μm was welded to the exposed positive electrode substrate to enhance the strength. The exposed negative electrode substrate was not strengthened. A positive electrode collector plate and a negative electrode collector plate were welded to each electrode, and a Cs sized Ni/MH battery with capacity of 3300 mAh was obtained in the same manner as in Example 1.

An average impedance of ten Cs sized Ni/MH batteries of Example 1 was about 5 mΩ, and that of ten batteries of Comparative Example was about 5.5 mΩ which was almost the same as that of Example 1.

In FIG. 6, "b" shows an average discharging curve of initial service capacity of ten Cs sized Ni/MH batteries of Example, and "c" shows that of Comparative Example. In a structure employing electrode substrates inferior in physical strength in which the collector structure of the positive and negative electrodes according to the present invention can be effectively employed, the battery capacity was increased by about 10% as a secondary effect since a thinner separator can be employed.

FIG. 7 shows cycle life test results of five Cs sized Ni/MH batteries according to Example 1 and those of the same type five batteries according to Comparative Example 1. In this test, the battery was charged 100% at 1C and discharged to 1.2 V at 1C in an atmosphere of 20° C., and the step was repeated. Basically, the battery was charged 120% at 0.1 C and discharged to 1.0 V at 0.2 C per 100 cycles and the capacity was measured. The results are plotted.

The results of the five batteries according to the present invention fell within the range between the curve d and the curve d'. To the contrary, four batteries according to Comparative Example caused micro short at the early stage and the capacity was decreased as shown by the curves e1 to e4.

In general-purpose batteries employing sintered electrodes, the microscopic short-circuit hardly occurs at such early stage. The aforementioned results were obtained by employing a foamed metal type positive electrode which is one of pasted type electrodes in general-purpose batteries. It is believed that this is because the active material was shed from an end of the electrode when the positive electrode was elongated due to the repeated charging and discharging, caused a microscopic short circuit. On the other hand, in the present invention, it is believed that the microscopic short circuit was prevented because the exposed electrode substrate end portion of the positive and/or negative electrode is bent together with the separator and the separator covers the ends of the adjacent electrodes.

Example 2

A positive electrode prepared in the same manner as in Example 1 was cut into a piece of 5 cm×4 cm. The active material powder was removed from one longer side of the electrode at a width of 2 mm to expose the electrode substrate. Then, the electrode was wrapped like a bag with the same separator as that used in Example 1 by heat welding except for the exposed portion. A negative electrode was also prepared by subjecting the electrode obtained in Example 1 to the same processing.

The aforementioned 10 (ten) positive electrodes and 11 (eleven) negative electrodes were stacked as shown in FIG. 5b. Each exposed end of the electrode was bent together with the separator in one direction, and collectors were welded to each end. The electrode unit was inserted into a rectangular battery case, and then aqueous solution was poured and the case was covered with a cap to obtain a rectangular Ni/MH battery with capacity of about 7 Ah. In the meantime, for the purpose of facilitating the welding of the cap to the exposed end of the electrode bent together with the separator before the welding, the exposed end portion of the outer electrode can be bent in the opposite direction.

In the case of the prismatic cell stated here, as shown in FIG. 4c stated in Example 1, the positive electrode may be shorter than the negative electrode. In this case, however, at the time of bending an electrode terminal portion, said terminal portion need not be bent together with a separator. One of the reasons is, for example, that the positive electrode is already wrapped by a separator which is like a bag. In particular, when such constitution is employed, bending an electrode lead portion of the electrode unit (the electrodes and the separators) from the both sides of thickness direction toward the center portion with an angle of about 90° is easy.

Examples 1 and 2 of the present invention can also be applied to a lithium secondary battery which includes a positive electrode obtained by applying $LiCoO_2$, $LiNiO_2$ or $LiMn_2O_4$ as a main material to a substrate of aluminum (Al) foil with a thickness of about 10 μm or its three-dimensioned substrate, a negative electrode obtained by applying carbon or oxide of Sn, Fe or Si as a main material to a substrate of copper foil with a thickness of about 10 μm or its three-dimensioned substrate, a separator made of polyolefin type fine porous film (about 20 μm in thickness), and organic electrolyte containing ethylene carbonate as a main ingredient. Furthermore, it is preferable to use an Al sheet as a positive electrode collector plate and a Cu sheet as a negative electrode collector plate.

The secondary battery according to the present invention can be preferably used as a high-power demand battery for use in, e.g., hybrid electric automobiles or electric tools.

While illustrative embodiments of the present invention have been described herein, the present invention is not limited to the various preferred embodiments described herein, but includes any and all embodiments having modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited.

What is claimed is:

1. A secondary battery comprising an electrode unit in which a positive electrode and a negative electrode are spirally wound with a separator interposed therebetween,
    wherein the electrode unit has a structure characterized in that
    (a) the positive electrode and/or the negative electrode includes (1) a flexible electrode substrate and (2) active material or material capable of absorbing/discharging active material (hereinafter referred to "pseudo-active material") impregnated in and/or coated on the electrode substrate,
    (b) an end portion of the separator wound spirally in a coaxial or elliptical manner is bent toward a center of the electrode unit,
    (c) the positive electrode has an electrode end portion constituted by the electrode substrate with substantially no active material or pseudo-active material at a positive electrode side end of the positive electrode, wherein at least a part of the electrode end portion is set apart from the bent end portion of the separator, a portion of the electrode end portion is electrically connected to an electrolyte-resistant positive electrode collector plate which is electrically connected to a positive electrode terminal of the battery, and end portions of separators disposed on either side of the negative electrode pack an end portion of the negative electrode, and/or
    the negative electrode has an electrode end portion constituted by the electrode substrate with substantially no active material or pseudo-active material at a negative electrode side end of the negative electrode, wherein at least a part of the electrode end portion is set apart from the bent end portion of the separator, a portion of the electrode end portion is electrically connected to an electrolyte-resistant negative electrode collector plate which is electrically connected to a negative electrode terminal of the battery, and end portions of separators disposed on either side of the positive electrode pack an end portion of the positive electrode;
    wherein the separators are arranged so as to prevent the active material or pseudo-active material that sheds from the electrode from contacting the collector plate with the ends of the separators sandwiched by the end portions of the electrodes.

2. The secondary battery as recited in claim 1, wherein the electrode end portion of the positive electrode and/or the negative electrode with substantially no active material or pseudo-active material is bent together with the separator.

3. The secondary battery as recited in claim 1, wherein the electrode end portion of the positive electrode is electrically connected to the positive electrode collector plate by welding, and the electrode end portion of the negative electrode is electrically connected to the negative electrode collector plate by contact or welding.

4. The secondary battery as recited in claim 1, wherein the electrode substrate of the positive electrode and/or the negative electrode is made of metal containing metal selected from the group consisting of nickel, iron, nickel-plated steel, aluminum and copper as a main ingredient.

5. The secondary battery as recited in claim 1, wherein the substrate of the electrode end portion of the positive electrode and/or the negative electrode is two-dimensional or worked two-dimensionally by press.

6. The secondary battery as recited in claim 1, wherein the electrode end portion of the positive electrode and/or the negative electrode has flexibility.

7. The secondary battery as recited in claim 1, wherein a length of the portion of the electrode end portion of the positive electrode and/or the negative electrode set apart from the separator is 0.2 to 2.0 mm.

8. The secondary battery having structure as recited in claim 1, wherein a surface of the positive electrode collector plate and/or the negative electrode collector plate is provided with a number of fine concavities and convexities.

9. The secondary battery as recited in claim 1, wherein the end portion of the opposite electrode which is adjacent to the positive electrode and/or the negative electrode provided with an electrode lead is shifted in the center direction of the electrode unit by 0.5 mm to 2.0 mm.

10. The secondary battery as recited in claim 1, wherein a part of a bent portion of an electrode lead overlaps a part of a bent portion of an electrode lead of adjacent same electrode.

11. A secondary battery comprising an electrode unit in which a plurality of positive electrodes and a plurality of negative electrodes are superimposed with a separator interposed between adjacent electrodes,
wherein the electrode unit has a structure characterized in that
(a) the positive electrode and/or the negative electrode includes (1) a flexible electrode substrate and (2) active material or pseudo-active material impregnated in and/or coated on the electrode substrate,
(b) each of the plurality of positive electrodes and/or plurality of negative electrodes is provided with an exposed electrode substrate with substantially no active material or pseudo-active material along one side thereof,
(c) the plurality of positive electrodes and/or plurality of the negative electrodes are covered with the separator except for each electrode end portion which is the exposed electrode substrate,
(d) electrode end portions of the plurality of positive electrodes disposed at one side of the electrode unit and/or electrode end portions of the plurality of negative electrodes disposed at the other side of the electrode unit are bent so as to cover respective side of the electrode unit,
(e) the bent electrode end portions of the positive electrodes are electrically connected to a positive electrode collector plate electrically connected to a positive battery terminal, and/or the bent electrode end portions of the negative electrodes are electrically connected to a negative electrode collector plate electrically connected to a negative battery terminal, and
(f) the separators are arranged so as to prevent the active material or pseudo-active material that sheds from the electrode from contacting the collector plate with the ends of the separators bent together with the end portions of the electrode in one direction and sandwiched by the end portions of the electrodes.

12. The secondary battery as recited in claim 11, wherein a lead portion of the positive and/or the negative electrode of the electrode unit are/is bent from the both sides of a thickness direction of the electrode unit toward the center portion.

13. The secondary battery as recited in claim 11, wherein the end portion of the opposite electrode which is adjacent to the bent electrode lead portion of the positive electrode and/or the negative electrode is shifted in the center direction of the electrode unit by 0.5 mm to 2.0 mm.

14. The secondary battery as recited in claim 11, wherein the electrode end portion of the positive electrode and/or the negative electrode with substantially no active material or pseudo-active material is bent together with the separator.

15. The secondary battery as recited in claim 11, wherein the electrode end portion of the positive electrode is electrically connected to the positive electrode collector plate by welding, and the electrode end portion of the negative electrode is electrically connected to the negative electrode collector plate by contact or welding.

16. The secondary battery as recited in claim 11, wherein the electrode substrate of the positive electrode and/or the negative electrode is made of metal containing metal selected from the group consisting of nickel, iron, nickel-plated steel, aluminum and copper as a main ingredient.

17. The secondary battery as recited in claim 11, wherein the substrate of the electrode end portion of the positive electrode and/or the negative electrode is two-dimensional or worked two-dimensionally by press.

18. The secondary battery as recited in claim 11, wherein the electrode end portion of the positive electrode and/or the negative electrode has flexibility.

19. The secondary battery as recited in claim 11, wherein a length of the exposed portion of the electrode end portion of the positive electrode and/or the negative electrode set apart from the separator is 0.2 to 2.0 mm.

20. A secondary battery comprising an electrode unit in which a positive electrode and a negative electrode are spirally wound with a separator interposed therebetween,
wherein the electrode unit has a structure characterized in that
(a) the positive electrode and/or the negative electrode includes (1) a flexible electrode substrate and (2) powder of active material or pseudo-active material impregnated in and/or coated on the electrode substrate,
(b) an end portion of the separator wound spirally is bent toward a center of the electrode unit,
(c) the positive electrode has an electrode end portion constituted by the electrode substrate with substantially no active or pseudo-active material at a positive electrode side end of the positive electrode, wherein at least a part of the electrode end portion is set apart from the bent end portion of the separator, a portion of the electrode end portion is electrically connected to an electrolyte-resistant positive electrode collector plate which is electrically connected to a positive electrode terminal of the battery, and end portions of separators disposed on either side of the negative electrode pack an end portion of the negative electrode, and/or
the negative electrode has an electrode end portion constituted by the electrode substrate with substantially no active or pseudo-active material at a negative electrode side end of the negative electrode, wherein at least a part of the electrode end portion is set apart from the bent separator, a portion of the electrode end portion is electrically connected to the battery case directly or via an electrolyte-resistant negative electrode collector plate which is electrically connected to a negative electrode terminal of the battery, and end portions of separators disposed on either side of the positive electrode pack an end portion of the positive electrode; and
(d) the separators are arranged so as to prevent the active material or pseudo-active material that sheds from the electrode from contacting the collector plate with the ends of the separators sandwiched by the end portions of the electrodes.

21. The secondary battery as recited in claim 20, wherein the electrode end portion of the positive electrode and/or negative electrode with substantially no active material or pseudo-active material exposed from the separator is bent together with the separator.

22. The secondary battery as recited in claim 20, wherein the electrode end portion of the positive electrode is electrically connected to the positive electrode collector plate by welding, and wherein the electrode end portion of the negative electrode is electrically connected to the negative electrode collector plate by contact or welding.

23. The secondary battery as recited in claim 20, wherein the electrode substrate of the positive electrode and/or negative electrode is made of metal containing metal selected from the group consisting of nickel, iron, nickel-plated steel, aluminum and copper as a main ingredient.

24. The secondary battery as recited in claim 20, wherein the substrate of the electrode end portion of the positive electrode and/or negative electrode is two-dimensional or worked two-dimensionally by press.

25. The secondary battery as recited in claim 20, wherein the electrode end portion of the positive electrode and/or negative electrode has flexibility.

26. The secondary battery as recited in claim 20, wherein a length of the exposed portion of the positive electrode and/or negative electrode set apart from the separator is 0.2 to 2.0 mm.

27. The secondary battery as recited in claim 20, wherein a surface of the positive electrode collector plate and/or negative electrode collector plate is provided with a number of fine concavities and convexities.

* * * * *